United States Patent
Erling (10) Patent No.: US 7,012,188 B2
(45) Date of Patent: Mar. 14, 2006

(54) FRAMING SYSTEM FOR SOLAR PANELS

(76) Inventor: Peter Stuart Erling, 28 Florence Street, St Peters, New S. Wales (AU) 2044

( * ) Notice: Subject to any disclaimer, the term of this patent is extended or adjusted under 35 U.S.C. 154(b) by 232 days.

(21) Appl. No.: 10/240,875

(22) Filed: Oct. 4, 2002

(65) Prior Publication Data

US 2004/0011354 A1    Jan. 22, 2004

Related U.S. Application Data

(63) Continuation-in-part of application No. PCT/AU01/00374, filed on Apr. 4, 2001.

(30) Foreign Application Priority Data

Apr. 4, 2000   (AU) .................................... PQ 6682
May 27, 2002   (AU) .................................... PS2539

(51) Int. Cl.
*F24J 2/52*     (2006.01)
*E04D 13/18*    (2006.01)
*H01L 31/05*    (2006.01)

(52) U.S. Cl. .................... 136/251; 136/291; 52/173.3; 257/433; 126/621; 126/622; 126/623

(58) Field of Classification Search ............... 136/251, 136/291; 52/173.3; 257/433; 126/621, 126/622, 623
See application file for complete search history.

(56) References Cited

U.S. PATENT DOCUMENTS

| | | | |
|---|---|---|---|
| 4,123,883 A | * | 11/1978 | Barber, Jr. et al. ............ 52/200 |
| 4,132,217 A | * | 1/1979 | Rom et al. .................... 126/675 |
| 4,223,667 A |   | 9/1980 | Paymal |
| 4,336,413 A | * | 6/1982 | Tourneux ..................... 136/251 |
| 4,636,577 A | * | 1/1987 | Peterpaul ..................... 136/206 |
| 4,677,248 A | * | 6/1987 | Lacey ......................... 136/244 |
| 4,850,167 A | * | 7/1989 | Beard et al. .................. 52/200 |
| 5,121,583 A | * | 6/1992 | Hirai et al. .................. 52/90.1 |
| 5,409,549 A | * | 4/1995 | Mori .......................... 136/244 |
| 5,524,401 A | * | 6/1996 | Ishikawa et al. ............. 52/173.3 |
| 5,706,617 A | * | 1/1998 | Hirai et al. ................. 52/173.3 |

(Continued)

FOREIGN PATENT DOCUMENTS

DE        19615306 A1  *  10/1996

(Continued)

*Primary Examiner*—Alan Diamond
(74) *Attorney, Agent, or Firm*—Welsh & Katz, Ltd.

(57) ABSTRACT

The invention relates generally to framing systems and more particularly is concerned with systems adapted to mount panels or laminates in an array on a supporting roof structure of a building exemplified with the mounting of solar electric photovoltaic (PV) panels. The framing system described uses extruded elongate elements with a sealing element to frame the PV panel as a weatherproof PV solar roof tile. Individual frame element profiles effectively embody the PV building integration, (BiPV) or mounting method, of the solar tile within the frame itself. Only a few additional flashing components are needed to complete the PV tile array as part of the roof, or with minor variations, as a PV wall cladding. Full BiPV panel mounting methods show potential to be used for co-generation (PV/T) of solar thermal energy capture in buildings. The batten support structures of the solar tile permit variation in roof batten spacing to be tolerated in retro-fit situations, make trafficable roof with the tiles possible and provide long term weatherability as a building element through moisture reduction by air flow and smaller surface contact. Draining of internal roof condensate from the back of the tiles to the exterior is another feature of the frame system described.

27 Claims, 10 Drawing Sheets

U.S. PATENT DOCUMENTS

| | | | | |
|---|---|---|---|---|
| 6,105,317 A | * | 8/2000 | Tomiuchi et al. | 52/173.3 |
| 6,269,596 B1 | * | 8/2001 | Ohtsuka et al. | 52/173.3 |
| 6,465,724 B1 | * | 10/2002 | Garvison et al. | 136/244 |
| 6,730,841 B1 | * | 5/2004 | Heckeroth | 136/251 |
| 2003/0184257 A1 | * | 10/2003 | Nomura et al. | 320/101 |
| 2004/0084078 A1 | * | 5/2004 | Yoshida et al. | 136/251 |
| 2004/0187909 A1 | * | 9/2004 | Sato et al. | 136/251 |

FOREIGN PATENT DOCUMENTS

| | | | |
|---|---|---|---|
| DE | 19521098 A1 | * | 12/1996 |
| JP | 7-122769 A | * | 5/1995 |
| JP | 08-070132 A | | 3/1996 |
| JP | 08-135121 A | | 5/1996 |
| JP | 10-159284 A | * | 6/1998 |
| JP | 10-190035 A | | 7/1998 |
| JP | 11-107453 A | * | 4/1999 |
| JP | 11-200561 A | * | 7/1999 |
| JP | 2000-87514 A | * | 3/2000 |
| JP | 2001-90293 A | * | 4/2001 |
| JP | 2001-107518 A | * | 4/2001 |
| JP | 2001-311267 A | * | 11/2001 |

* cited by examiner

FRAMING SYSTEM FOR SOLAR PANELS

This specification is for a continuation in part application based on a PCT/AU01/00374 filed Apr. 4, 2001.

The present invention relates generally to framing systems and more particularly is concerned with systems adapted to mount panel members or laminates in an array on a supporting structure. The present invention will be exemplified with particular application to the field of mounting solar electric panels, also known as photovoltaic (PV) panels which are adapted to be mounted suitably at an angle to the horizontal and with respect to the sun. However, the invention and the framing system is not necessarily limited to just these applications and extends to analogous applications. In this discussion we refer to use of the described system as mainly in roof mounting or roof integrating applications. However the system described can equally be suitable, with minor adjustments, for use in a vertical arrangement as an external PV wall cladding system.

In the field of solar PV panels, proposals have been made to form the PV panel to have the general characteristics of a roofing tile so that the PV laminate may be integrated into a roof, commonly but not exclusively, a tile roof. An alternative approach is to have a panel which is adapted to be mounted over a roof However, important considerations to the design and development of PV panels are the ability of the panels to be effectively integrated architecturally into a roof design. With in-roof integrated panels there is also known to be a greater opportunity to beneficially capture solar thermal energy in addition to PV electrical energy to use within the building on which the PV tiles are installed, a field of solar energy development known as PV/Thermal or PV/T. Where the panels take the place of conventional roofing elements such as tiles or metal systems, reliable and convenient mounting within the roof and effective weather sealing is most important.

One known system relies on each solar panel or tile having a framework for mounting the PV laminate with the seal around the periphery of the laminate and the framework having structural features to facilitate its mounting, e.g. on conventional roof battens. However, the known framework is of fixed proportions and therefore is not necessarily desirable for some installations and will not conform with, for example, standard batten spacings.

Fixed proportions also severely limit the number of commercially and commonly available PV laminates that can be incorporated into the framework. Custom size PV laminates come at a cost premium making any system using them less competitive in the market.

Other known roof integrated framing systems require additional structures below the PV laminate to ensure weather sealing, or use extruded frame sections that need additional components to attach to the roof structure, in some cases lacking a smooth external finish appearance both to the eye and external environmental conditions.

Other known roof integrated solar panel support systems do not provide complete edge protection of the solar panel laminate that can be easily shattered if an edge impact occurs including hail stones, and these system also lack protection of the laminate edges from weather exposure that over a longer period can cause de-lamination and water ingress into the solar panel resulting in electrical failure and total replacement before normal lifetime.

These systems usually require a larger inventory of components to be manufactured, warehoused, transported and used in installation and are not inherently a PV integration system embodied in a simple frame that encapsulates the PV laminate. The ideal is a PV laminate frame system for building integration, simply fitted to the PV laminate during the usual manufacturing process.

There is therefore a need for new and useful alternatives to prior proposals including arrangements which lend themselves to being dimensioned to accommodate standard size, standard production line PV laminates, that can be easily factory assembled, that need minimum additional components to the frame and that facilitate integration into a roof structure with effective weather sealing of the panel elements.

It is common for solar panel frame materials to be made from aluminium material that is surface treated against corrosion for the arduous climatic exposure it has to endure however aluminium has a significant embodied energy in its life cycle therefore a framing system that can use lower cost and lower embodied energy materials like plastics but that can still endure a long service life is desirable. Plastics also can provide better thermal insulation between outside and inside conditions of a building when used in the framing of glass than aluminium, which is a good conductor of thermal energy unlike plastics that are poor thermal conductors. It would therefore be beneficial to devise systems which can utilise the advantage of plastics in combination with a lower proportional use of surface treated aluminium but retaining the desirable and proven long term weather endurance of aluminium in the solar tile frame system.

In one aspect the present invention consists in a framing system for mounting a solar panel on a building structure, the framing system comprising:
(a) an upper elongate frame element;
(b) a lower elongate frame element;
(c) two side elongate frame elements;
(d) wherein;
  i) each of said frame elements has an elongate channel for engaging in weather-sealing relationship with an associated edge of a solar panel and;
  ii) the frame elements are adapted to be inter-connected at respective corners of the frame system,
(e) the upper frame element has a depending retaining element for retaining the framing system from movement in a direction down the building structure; a supporting element for supporting the frame system on a batten and upper surface portion with a slight recess for weather-sealing purposes, the recess being spaced from an inner edge portion within which the elongate channel is provided and on which a lower frame portion of a further solar panel is adapted to be supported in overlapping, weather-sealing relationship and;
(f) the side frame elements each having on an upper surface portion an upstanding wall element for cooperation with a capping element adapted to bridge between adjacent solar panels to form a weather seal.

Preferably, at least one of the side wall elements on an outer upstanding edge face has means for mounting a resiliently deformable seal whereby adjacent panels engage through the seal in a manner which controls the spacing between panels, yet permits the taking-up of tolerances.

Preferably, the upstanding wall element on each frame element has an undercut whereby snap-fitting engagement is achieved with the corresponding depending wall of the capping element.

Preferably, each of the upper and lower wall elements is formed from an extrusion of generally an open box structure and includes screw shank engagement cavities whereby fixing screws applied from the exterior of the side of the side frame elements can engage to secure corner joints.

To ensure dissipation of moisture from condensation on the lower face of a solar panel, preferably the upper region of the upper frame element includes an upstanding lip for directing any condensation from the next superior framed solar panel onto an upper face of the upper frame element.

The upper elongate frame element may be made of two parts, the smaller part being a right angle shaped extrusion section that forms the depending leg to support the solar panel from movement in a downward direction on a supporting building structure, this part is used typically as three discrete, equal length pieces for each upper frame element and snap-fit into the larger part of the upper frame elongate element of a generally open box form.

Preferably, the lower frame element has a tip portion for engaging the upper surface of the upper frame element of the next inferior framed solar panel and extends to an overhanging lip element for engaging the inferior solar panel and shielding from the weather the elongate channel in the upper frame element of the inferior framed solar panel.

Preferably the lower frame element has a retaining recess channel portion that takes a sealing gasket onto which a portion of the solar laminate lower edge underside lies and is supported, weather sealed and edge protected.

Preferably a seal between the lower frame elongate element and the solar panel laminate is made by a elongate polymeric interface gasket of a generally flat, broad shape with a precise profile adapting between the lower surface of the solar laminate and the upper surface of the lower frame elongate element so that the upper surface of the solar laminate and the external exposed portion of the lower frame elongate element are at the same surface height and present no barrier to water running off the solar laminate external surface this junction between the solar laminate and lower frame element being subject to the most water.

Preferably the sealing gasket includes an upper curving lip section that seals between the curved face, vertically rising, in the lower frame and retains the thin curved edge of the solar laminate glass protecting and insulating it from direct mechanical and electrical contact to the lower frame material and protecting the solar panel lamination from long term weather exposure.

Preferably the gasket has a returning overhang lip portion at the top of the upward curve shape that narrows to a fine edge, this being a compliant seal to the upper surface edge of the solar panel laminate glass that provides minimal restriction to water flow off the external surface of the solar laminate whilst effecting a seal between the glass and the gasket and the lower frame element along this joint.

Preferably the upper lip of the gasket has a ridge profile at the external face of the curving upper lip that engages into a groove with an overhanging lip portion in the lower frame elongate element recess channel section that retains the gasket upper lip firmly from lifting out of the lower frame retaining at this location.

Preferably the polymeric gasket extends under the solar laminate bottommost surface and has a series of ribbed features that act as a multitude of sealing surfaces to the solar laminate underside to an extent that any water that may enter between the solar laminate and the gasket can not travel far due to the sealing properties of the gasket and gravity due to the downward slope angle that the solar tile is usually installed.

Preferably the upper edge of the broad, flat polymeric gasket is shaped with an inverted triangular profile portion that fits over the uppermost edge of the lower frame element and forms a join with an underlying surface at an angle to the solar laminate back surface to direct any condensation moisture by surface adhesion into the drainage channel formed by the upstanding lip of the upper frame elongate element directly beneath in the inferior solar tile.

Preferably the side frame elongate element has an outer side wall accommodating an undercut groove for retaining a flange of a seal and in the opposite side an elongate glazing channel is provided to mount the solar laminate so that an overhanging lip is provided for protecting from the weather and in particular UV exposure the glazing channel where sealing occurs typically through the use of a polymeric sealing strip or gasket.

Each elongate frame element may be made of two parts, one being a smaller snap fit part which forms the uppermost wall of the elongate channel for weather sealing of the lower frame element to the solar laminate and which engages with a larger part in a snap-fit with undercuts at the lower end of two depending walls from the smaller part engaging with corresponding undercuts in the larger part, the smaller snap fit section having a sealant groove on the lower surface of the wall for forming weather sealing for the solar laminate when snapped into place, the groove being for retaining a polymeric sealing compound that can be applied in a 'wet' or 'sticky' state to form a weather/water seal between the lower elongate frame element inside upper edge and the encapsulated solar laminate.

This junction is the most critical water seal location of the solar tile. The snap fit is used as it allows easier and cleaner application of the sealing compound in assembly of the frame to the solar panel with less or easier clean-up of the 'wet' sealing compound once the section is snap fitted.

Preferably, each side frame element is an extrusion having a body portion of hollow form, an outer side wall accommodating an undercut groove for retaining a flange of a seal and in the opposite side an elongate glazing channel is provided to mount the solar laminate so that an overhanging lip is provided for protecting from the weather and in particular UV exposure the glazing channel where sealing occurs typically through the use of a polymeric sealing strip.

This arrangement permits the polymeric sealing material to extend in effective sealing arrangement beyond the outer limit of the glazing channel yet there is an overhang which covers this portion and protects it from the elements.

Preferably the extent of the overhanging lip is constrained so that minimum safe edge engagement of the solar panel glass is achieved, but that it does not encroach on the solar cells or PV element located at the outer edge of the solar panel. This permits the maximum gap possible between the PV and the overhanging lip to avoid shading of the PV by the frame elements.

Preferably the lower wall portion of the glazing channel extends further than the upper wall, and provides greater engagement and support to the underside of the solar panel.

Preferably the glazing polymeric seal has an asymmetric shape, a lip on the lower wall portion extends beyond the edge of the lower glazing channel wall providing additional support to the underside of the solar panel, and the upper wall is constrained to fit under and inside the glazing channel overhanging lip.

Preferably each side frame element incorporates in its lower surface an undercut channel e.g. of mushroom-shaped cross section for receiving either in a snap-fit arrangement or preferably the head of metal screws for the attachment of transversely extending mounting elements for supporting the solar panel off a roofing batten.

Preferably the transversely extending mounting is adjustable in its relative position on the frame by virtue of the elongate mushroom groove on the side elongate elements allowing for tolerance to variations in roof batten interspacing. The transverse batten support elements are preferably made up of an elongate element that spans from one side elongate element of the solar tile to the other and is attached to them preferably by a screw or snap fit fixing. Along the spanning element there are sets of spacers that i) fill the gap between the underside of the solar panel and the top surface of the transverse spanning element, and, ii) fill the gap between the bottom of the transverse spanning element and the roof batten. The shape of these spacers is preferably a series of vertically running ribs held together by horizontal runners, each vertical rib having a lower undercut at either end that provides the snap-fitting of the spacers to the mating elongate undercuts on the outer side walls of transverse batten support, and, iii) at the ends of each spacer are an additional pair of the vertical ribs with an undercut shape for snap engaging into the under cut channel on the lower surface of the solar tile side frame elongate elements, and thereby act as the snap attachment of the transverse batten support element to the side frame elongate element.

iv) provide the spacing and support in a way that allows moisture such as condensation on the underside of the solar panel to run freely down without interference by the transverse spanning element. Similarly the ribs allow airflow between the transverse spanning element and the underlying roof batten avoiding moisture in that location that might otherwise promote rotting of the roof batten.

Preferably the joins between both the upper frame element and the lower frame element to the side frame elements are made through adaptive corner pieces that have extensions of a profile which can insert into each adjoining frame element and that are also clamped and secured tightly together between the adjoining frame elements. There is left- and right-hand, mirror image, versions of the upper and lower corner pieces, so four distinct corner pieces per tile.

Preferably the corner pieces adapt upper-, lower- and side-frame elongate elements that have square-cut ends that minimise the fabrication and waste off-cuts of elongate elements which can be readily cut in groups because of the square end cuts.

Preferably there are two securing screws at each elongate frame corner joint, screw holes pre-drilled in each side frame element aligning with screw shanks in the profiles of the upper and lower frame elongate elements.

Preferably the location of the side frame screw holes are identical for upper and lower frame joints so that one side frame is fabricated for use interchangeably in either left or right hand side of the solar tile.

Preferably the corner pieces form adaptive surfaces to mate the side and respective upper or lower frame elements together in close tolerance and form weather tight joins with applied sealant, each corner piece having sealant grooves provided for sealant to be retained between surfaces of joining parts brought together.

Preferably each corner piece has an extension portion that is shaped in profile to mate between the abutting surfaces of the respective elongate frame elements.

Preferably each corner piece has an extension in the axis of the side frame elongate element with a profile that inserts into the side frame element open hollow box structure the profile of the insert having a tapering or 'T' shape which permits the side frame snap-fit to lock the side frame element sections together over the corner piece insert in assembly.

Preferably each upper or lower corner piece has an extension in the axis of the upper or lower frame elongate element respectively that has a profile that matches hollow forms provided in the elongate elements to secure the respective corner piece insert extensions by enclosing surfaces which extend greater than 180 degrees circumference of the insert extension end profile;

i) in the upper frame elongate element are provided by two horizontal ledges on opposing walls of the uppermost open hollow form section, ii) in the lower frame elongate element are provided by opposing return ledges in the open hollow form of the lower half of the element.

Preferably the corner pieces have an upstanding lip along the upper edge aligned in the axis of the side frame element that mates to the same shape of upstanding lip on the side frame element smaller snap-fit part, the upstanding lip being to retain any water downward to the external surface of the tile.

Preferably the upper corner piece has a groove on the upper surface that assists to drain condensate from the upper elongate element upstanding lip portion onto the external surface of the solar tile.

Preferably the upper corner pieces have a generally flat upper surface so that the lower corner piece of the superior tile can be supported on the flat surface and form part of a weather overlap seal without interference between the lower and upper corner pieces by the side frame element upstanding wall and capping element of the inferior tile, interference between upper and lower corner pieces is avoided by:

i) an arch profile in the front face of the lower corner piece, ii) the side frame elongate snap-fit section being shorter in length than the larger side frame elongate section, the larger section also underlies and becomes clamped to the upper corner flat surface, iii) the side frame elongate snap-fit section of the inferior tile being located farther down the side frame from the upper corner piece than the larger side frame section but in a weather sealing relationship to the flat upper surface of the upper corner piece.

Preferably the lower frame elongate element corner pieces have the following features:

i) an outward extending sleeving wall aligned in the axis of the side frame element and perpendicular to the lower corner piece external front face which in profile is a sleeve forming part of an arch shape weather covering of the inferior solar tile side frame capping element, i) the lower corner piece has a front face surface with smooth convex curving edges and sloping faces that close over and seal to the open end of the side frame elongate element including that portion that sits above the solar laminate upper surface level, sealing and protecting the side frame open end from weather, and providing an aesthetically pleasing smooth, rounded surface for water run off, and ii) is made from a material suited to long term solar exposure.

Preferably the side frame elongate capping element has an end cap that:

i) closes the open lower end of the capping elongate element and is secured to the capping by means of deforming the capping elongate element side-walls end edges to fold into slots provided on the end cap moulding, and ii) has a lower skirting wall on either side wall that when fixed and integral to the capping elongate element lies inside the sleeve formed by the opposing extending walls of adjacent left and right hand right hand lower corner pieces on installed solar tiles, iii) is made of a moulded material suited to long term solar exposure.

For illustrative purposes, embodiments of the invention will now be described with reference to the attached drawings of which.

BRIEF DESCRIPTION OF DRAWINGS

Figure 1:
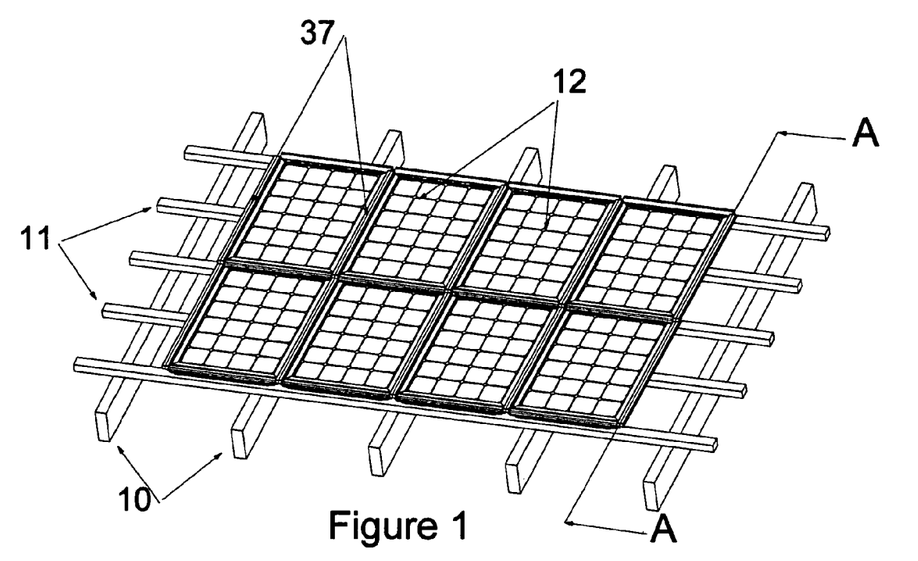
FIG. 1 is a schematic view of a multiplicity of solar tiles mounted on a roof structure in accordance with an embodiment of the invention.
Figure 2:
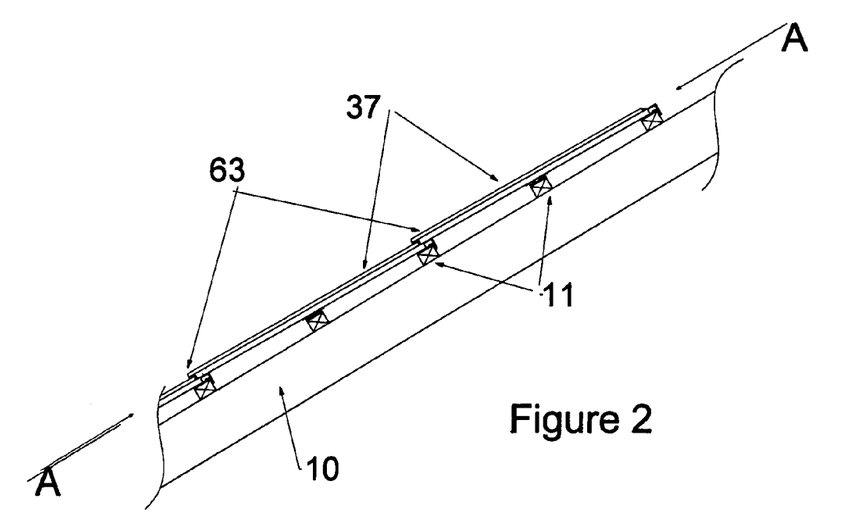
FIG. 2 is a side elevation along the line A—A of FIG. 1.
Figure 3:
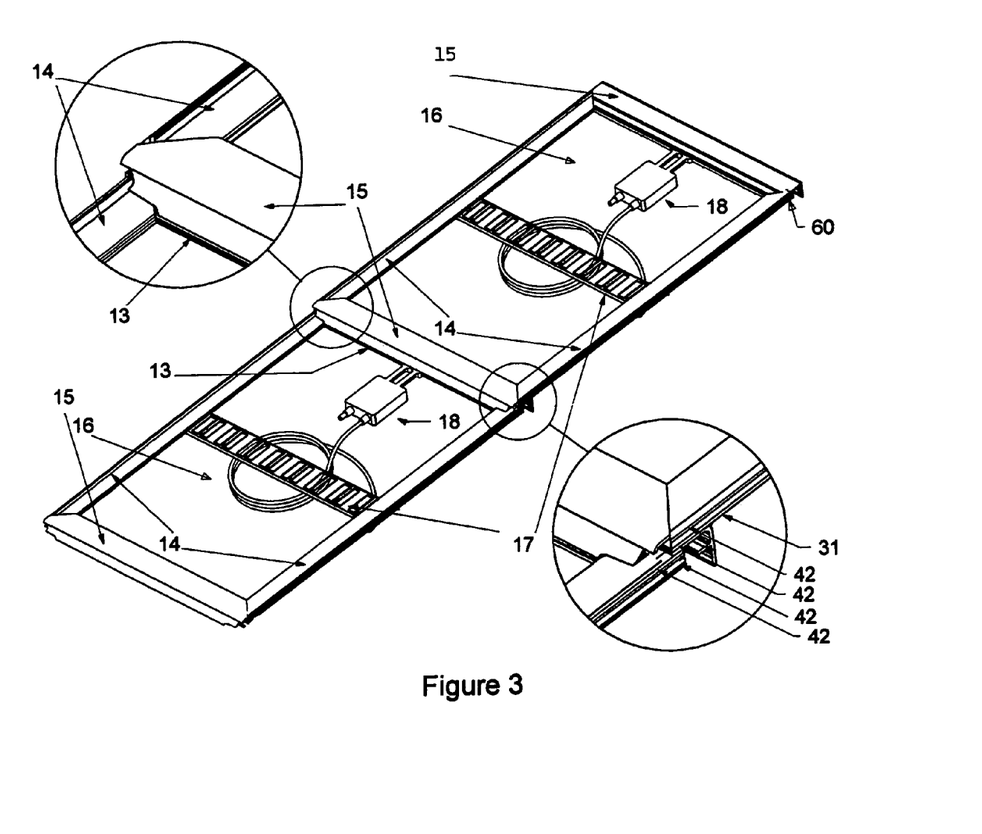
FIG. 3 is a schematic plan view of two of the solar panel laminate tiles as used in FIGS. 1 and 2 and ready for installation but with the solar panel laminate not shown.

Referring first to FIGS. 1 to 3, a roof structure comprises parallel spaced rafters 10 with rectangular cross section horizontal battens 11, spaced apart by approximately half the length of a solar tile. FIG. 1 shows an array of solar tiles 12 which are identical and joined in weather sealing relationship by the capping elements 37.

Referring to FIG. 3, two solar tiles are viewed from above and each tile has an upper frame element 13, side frame elements 14 and a lower frame element 15 which are secure together and hold in a weather-sealing arrangement a laminate 16 (not shown) of the nature of a solar panel. At approximately the mid position, a transverse support 17 is provided and is fixed at each end to the side frame elements 14. In larger formats of the solar tile there can be more than one such transverse beam, in one typical case there may be two transverse beams. FIG. 3 also shows an electrical connector box 18 which is electrically connected to the solar panel and connected into the array to 15 provide electricity.

Figure 4:
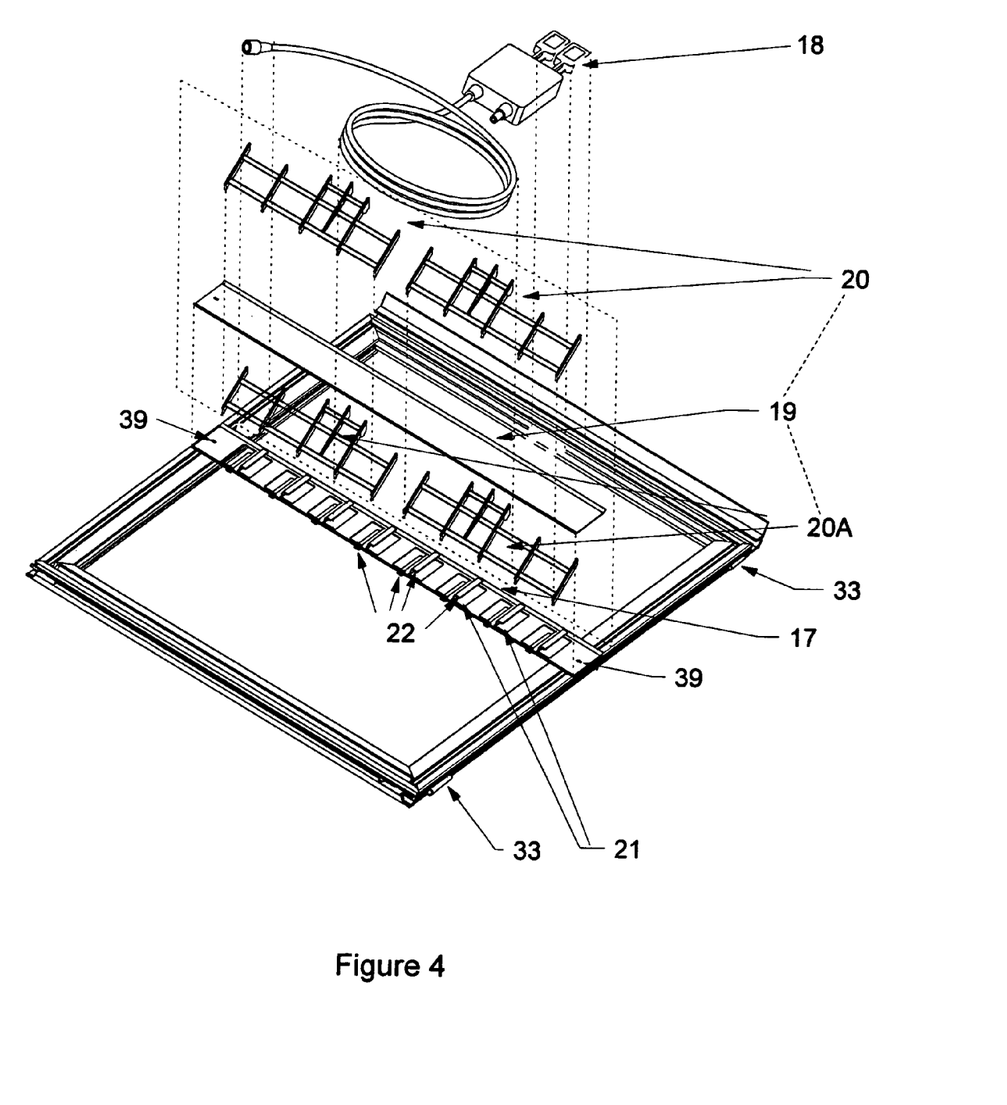
FIG. 4 is an inverted plan view of a solar tile showing detail of two embodiments of transverse supports.

Referring to FIG. 3 the transverse support 17 is an embodiment that may be substituted by another preferred embodiment shown in FIG. 4 parts 19, 20 & 20A. The embodiment 17 uses a stamped metal profile. Referring to FIG. 4 the metal profile 17 carries an array of spaced wedge elements 21 with respective flutes 22 that extend in both the upward and downward direction from the transverse part for spacing the transverse element from a further batten, as is best shown in FIG. 2, and for spacing between the transverse support and the back of the panel laminate. The height of the flutes 22 needed in the stamped metal transverse support depends on the relative position of the transverse support in the solar tile frame.

In another embodiment the transverse support 19 is an aluminium extrusion with an associated plastic moulded array of parallel flutes 20, 20A. The array of spacer flutes 20A are located under the transverse support between it and the back of the panel laminate forming vertical channels that allow condensate water on the back of the laminate to run freely past the transverse support. This can also occur with the other embodiment using downward pointing flutes 22 of the stamped metal transverse support. In the preferred embodiment an array of plastic flutes 20 is also located above the transverse support 19 for spacing from a further batten. In some formats of the solar tile a plastic spacer flute array may not be needed between the transverse support and roof batten, depending on the position of the transverse support relative to the frame. In both embodiments the flutes on both the plastic moulded array 20 and the stamped metal embodiment 22 both permit allow air flow between the roof batten and the transverse support preventing moisture build-up and rotting of the roof batten.

Figure 5:
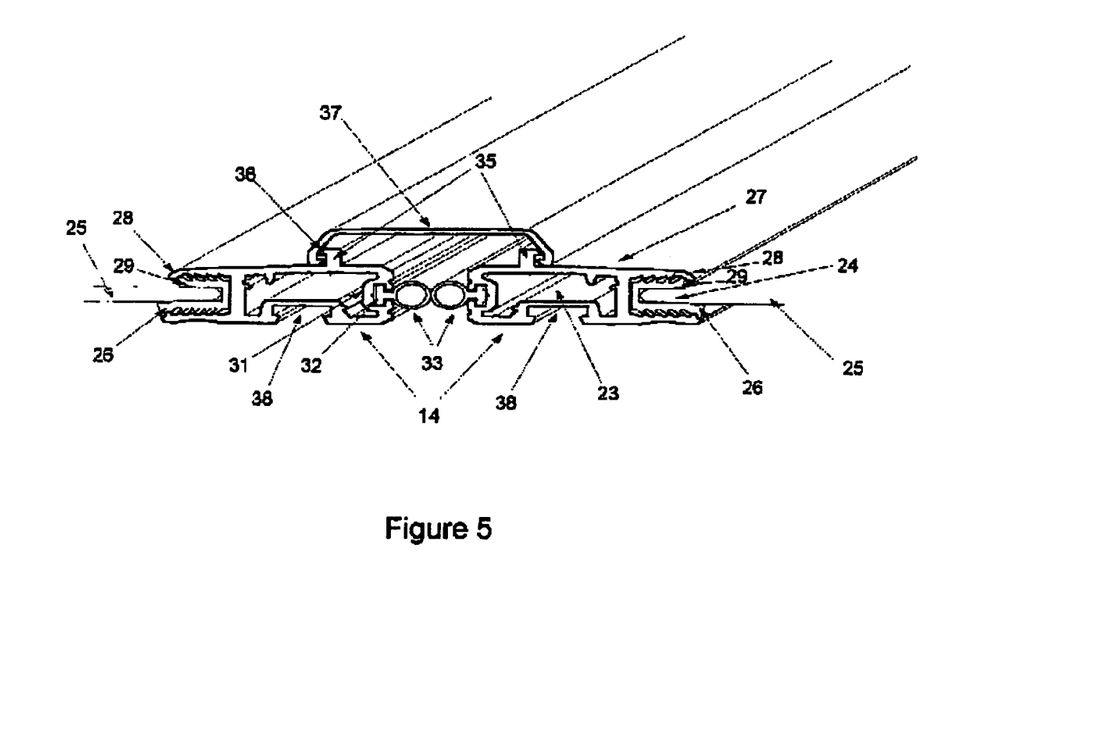
FIG. 5 is a cross-sectional view on an enlarged scale illustrating weather resistant joints between adjacent side frame elements of the solar tiles as used in FIGS. 1 to 3; and, FIG. 6 is a detailed cross-sectional view on an enlarged scale showing the interrelationship of an upper frame element of a first inferior solar tile which is supporting the lower frame element of a second superior solar tile.

Referring now to FIG. 5, a joint between adjacent solar tiles is illustrated. The side frame element 14 in each case is an aluminium extrusion, although in other embodiments each frame element may be a plastic extrusion. The extrusion has a tubular body portion 23 and a glazing channel 24 defined between spaced walls which accommodate a solar tile laminate 25 sealingly engaged in a polymeric channel-shaped seal 26. An upper wall portion 27 has a lip 28 which overhangs a tip portion 29 of the polymeric seal and thereby protects it against the effects of the elements including rainwater and ultra violet light thereby ensuring that there is a reliable seal is established and maintained. The free upstanding edge wall 31 of the tubular section 23 has an undercut portion for accommodating a T-shaped rib 32 of a resiliently deformable tubular seal 33. A series of such seals are at spaced locations as best shown 33 in FIG. 4.

The tubular seals are designed to permit the solar panels to be conveniently located slightly spaced from one another and to ensure that the space between respective, upstanding retaining walls 35 is accurately controlled. Each of the walls 35 has a shoulder 36 extending upwardly for snap fitting engagement with an extruded cover strip 37. The cover strip 37 can conveniently be secured with a fixing screw at a location of the lower frame element of the next tile above in the system best shown 63 in FIG. 2. The fixing screw also passes through into the supporting batten 11, and thereby secures the entire solar tile to the supporting structure against wind lift.

FIG. 5 shows a mushroom cross section groove 38 integrally formed into the side element extrusion for accommodating snap fit or screw fixing securing elements of corresponding shape and are identified in FIG. 4 as item 39 and which secure in place the transverse beam 17.

Figure 6:
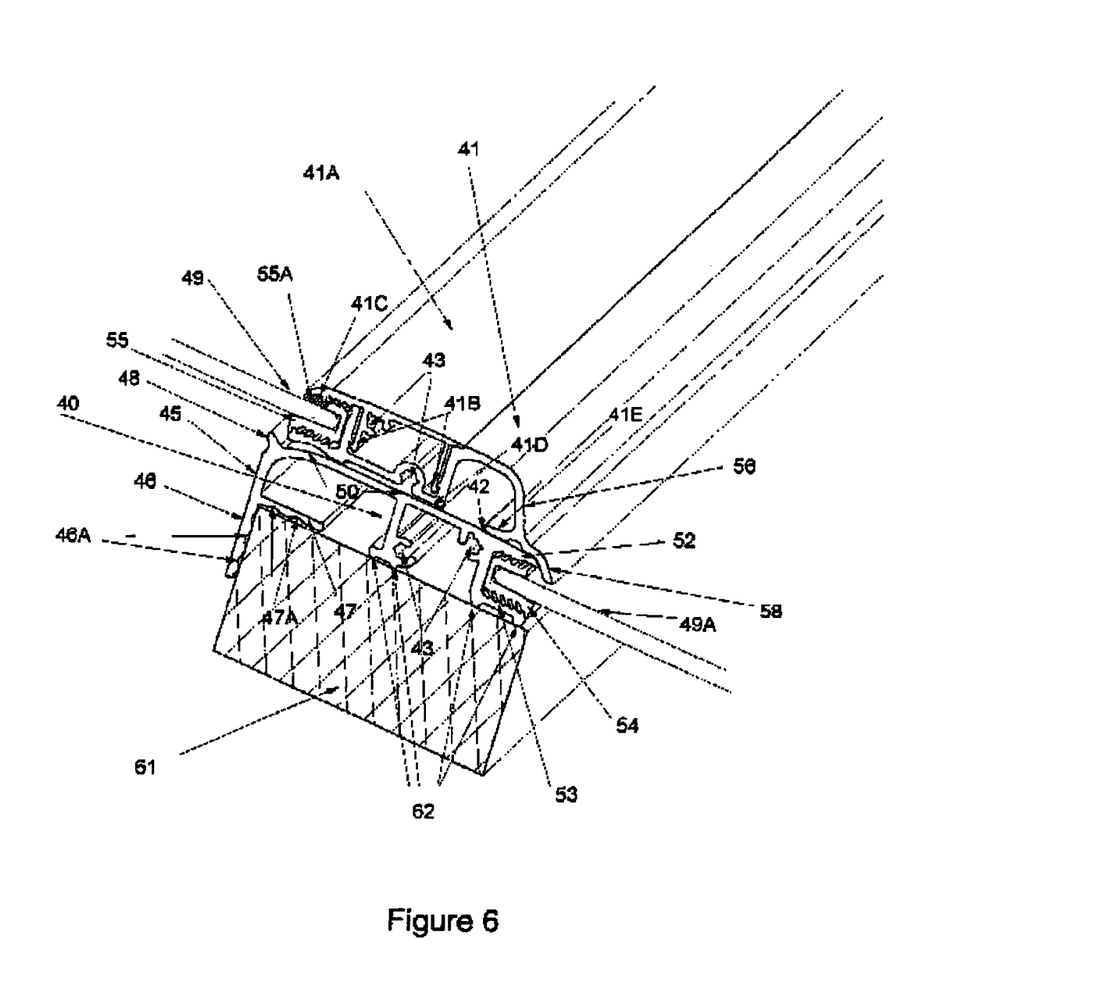

Referring now to FIG. 6, an upper frame element 40 for an inferior solar tile is shown together with a lower frame element made of two parts 41, 41A of a superior solar tile in overlapping relationship and illustrating the installed position. As indicated in FIG. 3, mitre joints are formed at each corner of the rectangular frame and two screws 42 are applied through the side wall 31 of the side frame element to threadably engage in self tapping arrangement with corresponding receiving cavities 43 in the upper and lower frame elements 40 and 41, 41A.

The upper frame element 40 has a rear wall 45 having a depending retaining wall 46 for hooking behind the edge of a batten 61 to retain in position the solar tile and a lateral wall 44 for supporting the solar tile. The rear wall 45 incorporates an upstanding lip 48 which ensures deflection of any condensation dripping off a superior solar tile laminate 49 to deflect the condensate along the upper surface 50 of the wall from which drainage occurs to the exterior of the inferior solar panel 49A via the gap provided between upper and lower elements 41D and recess 47A provided for weather sealing purposes.

The wall element 50 also incorporates a glazing channel defined between a pair of walls 52 and 53 between which a U-shaped polymeric sealing element 54 is located. The lower frame element 41, 41A similarly has a U-shaped polymeric element 55 for sealing engagement with the laminate 49, and has an additional 'wet' polymeric seal 55A located under a groove 41C of the snap fit part 41A. Snap fit part 41A is engaged to become a part of the lower frame element 41 by the under-cut snap fittings 41B that lock 41 and 41A together, and is set in place over the solar panel 49 after the wet seal 10 polymeric material 55A has been applied, usually dispensed in semi-liquid form from an orifice, into the groove 41C of 41A.

At its free-edge region the element 41 has a forward depending wall 56 with a base wall portion 47 configured for support on the upper face of element 40 by setting into a slight recess 47A in the upper face of element 40 and an extending downwardly curved lip 58 which overhangs the sealing membrane 54 for weather protection purposes. The lower portion 41D of 41 does not directly contact the upper face of element of 40 leaving a gap for moisture to drain to the exterior of inferior solar panel 49A.

Numerous points of detail in the system described above with reference to the drawing do provide distinct advantages and the more important features will now be summarised:

External overhangs are provided on the glazing channels in order to protect polymeric sealing elements from the weather and in particular direct UV exposure. In the case of the upper frame element, the sealing element is exposed but the overhanging lip of the lower frame element of the next tile unit above provides the protection.

The transverse supports are readily attached by snap-or screw- fit elements to the desired position and especially in the case of retrofitting to existing roofs, position adjustment can suit the existing battens. The height of this transverse support is also selectable to suit the position along the frame.

As shown the preferred form of the upper frame element is to incorporate a pair of grooves 46A in the depending leg thereby reducing the contact surface area between the leg and the batten to minimise the potential for moisture being trapped between the two surfaces and decay resulting. For the same purpose grooves 47A and depending lumps 62 are provided in the preferred from of the upper frame element.

The resilient deformable tubular elements 33, as shown in FIG. 5, provide for suitable spacing between adjacent units and the spacing function permits uniform distances to be established but also there is an allowance for movement by thermal expansion and contraction.

The preferred embodiment uses plastic spacer elements 20 and 20A as best shown in FIG. 4 and the profile permits air circulation and avoids moisture being trapped as this would be deleterious to wooden roof battens. Furthermore these plastic elements when set in place on the aluminium extruded transverse support 19 ensure that the desired angle of inclination is established. Depending lumps 62 on upper frame element 40 also introduce a pitch angle of element 40 relative to the roof batten. The pitch profile is defined by these elements to ensure that the lower frame element 41 is at the correct elevation above the underlying batten so that when the lower tile is in position the spacing between the batten and the frame element 41 is taken up by the frame element 40. Thus inter-engaging tile members corresponding to a roof tile system are obtained.

Figure 7:
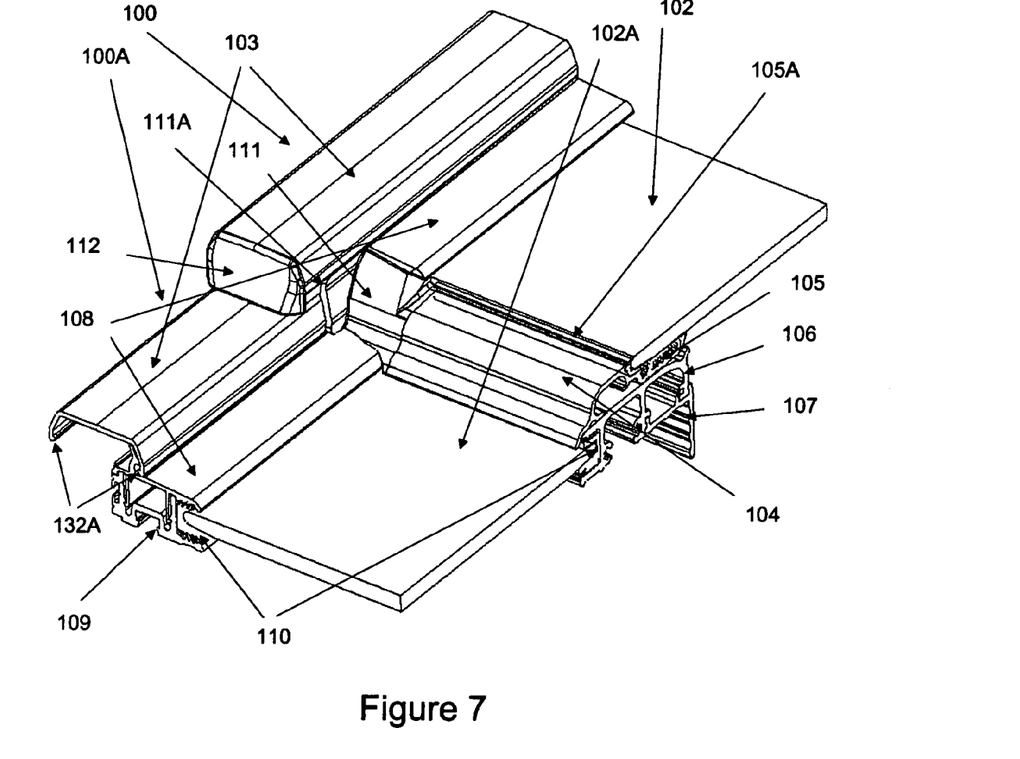
FIG. 7 is an isometric computer rendition of a portion of two solar tiles showing the detail of the overlap joining between tiles and cross sections of all the elongate frame elements illustrating how they cooperate and also showing the capping elongate element and end cap and the frame adapting lower corner piece shown in accordance with a second embodiment of the invention.
Figure 8:
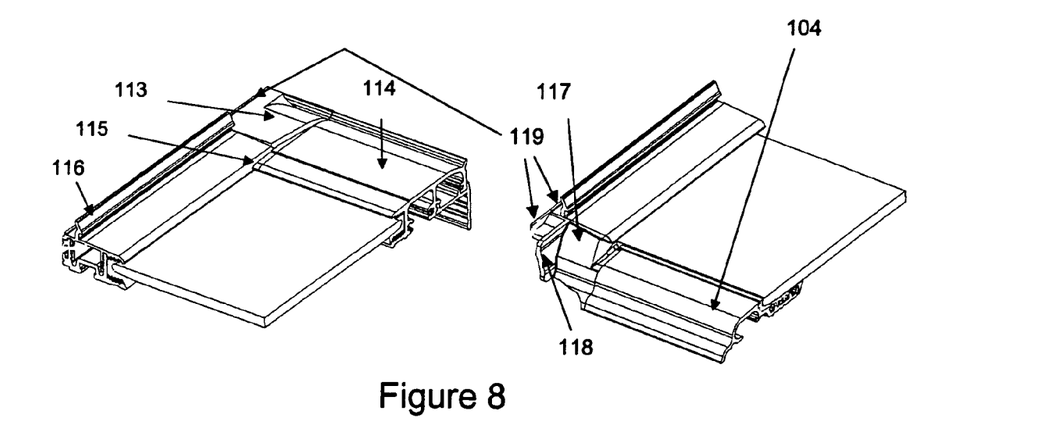
FIG. 8 is an isometric computer rendition showing two separate views of the upper and lower solar tile frame joints of the upper and lower frame elongate elements respectively to the side frame elongate element via the adapting corner pieces.
Figure 9:
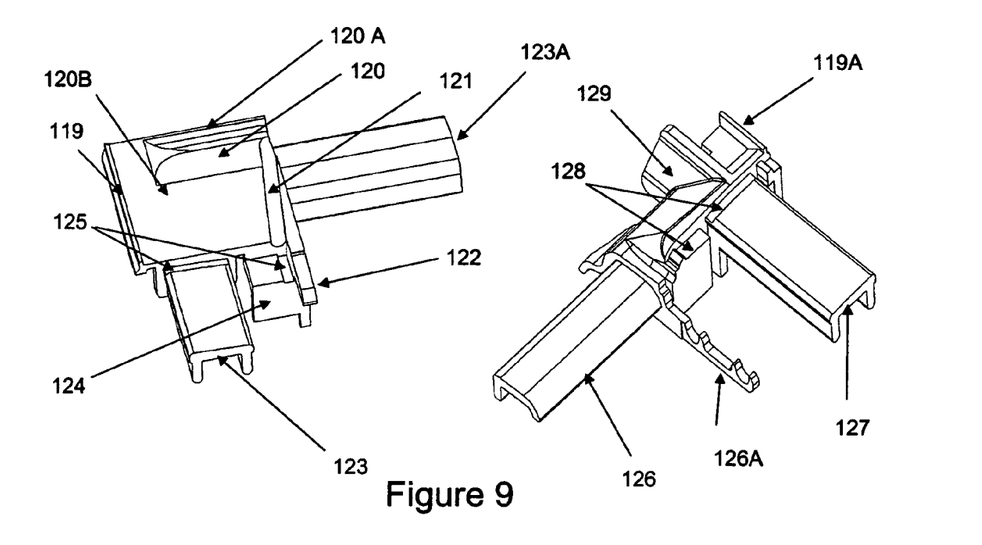
FIG. 9 is an isometric computer rendition of one side pair of an upper and a lower corner piece of a solar tile without any frame elements shown.
Figure 10:
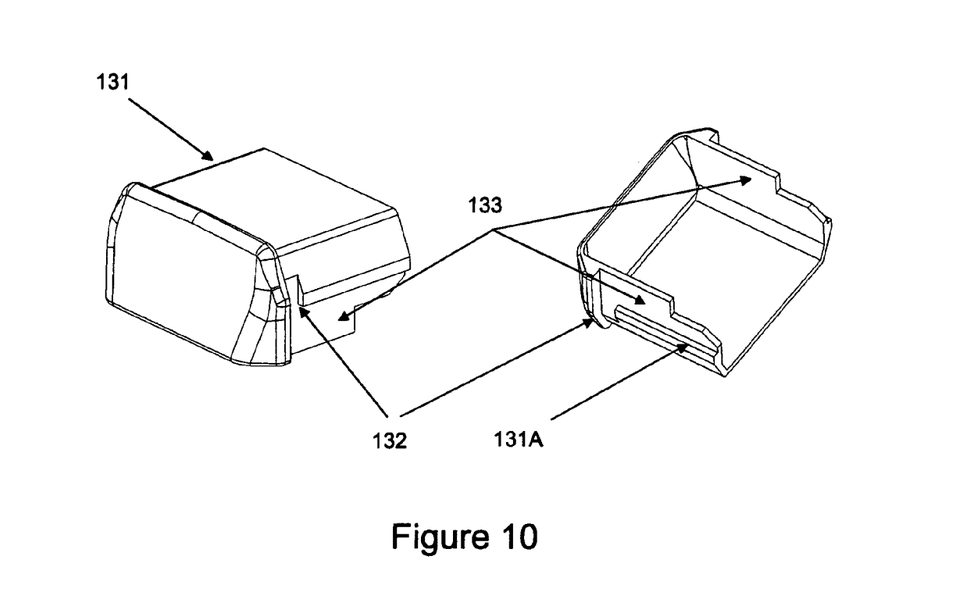
FIG. 10 is an isometric computer rendition of the elongate capping end cap showing two views of the same end cap.
Figure 11:
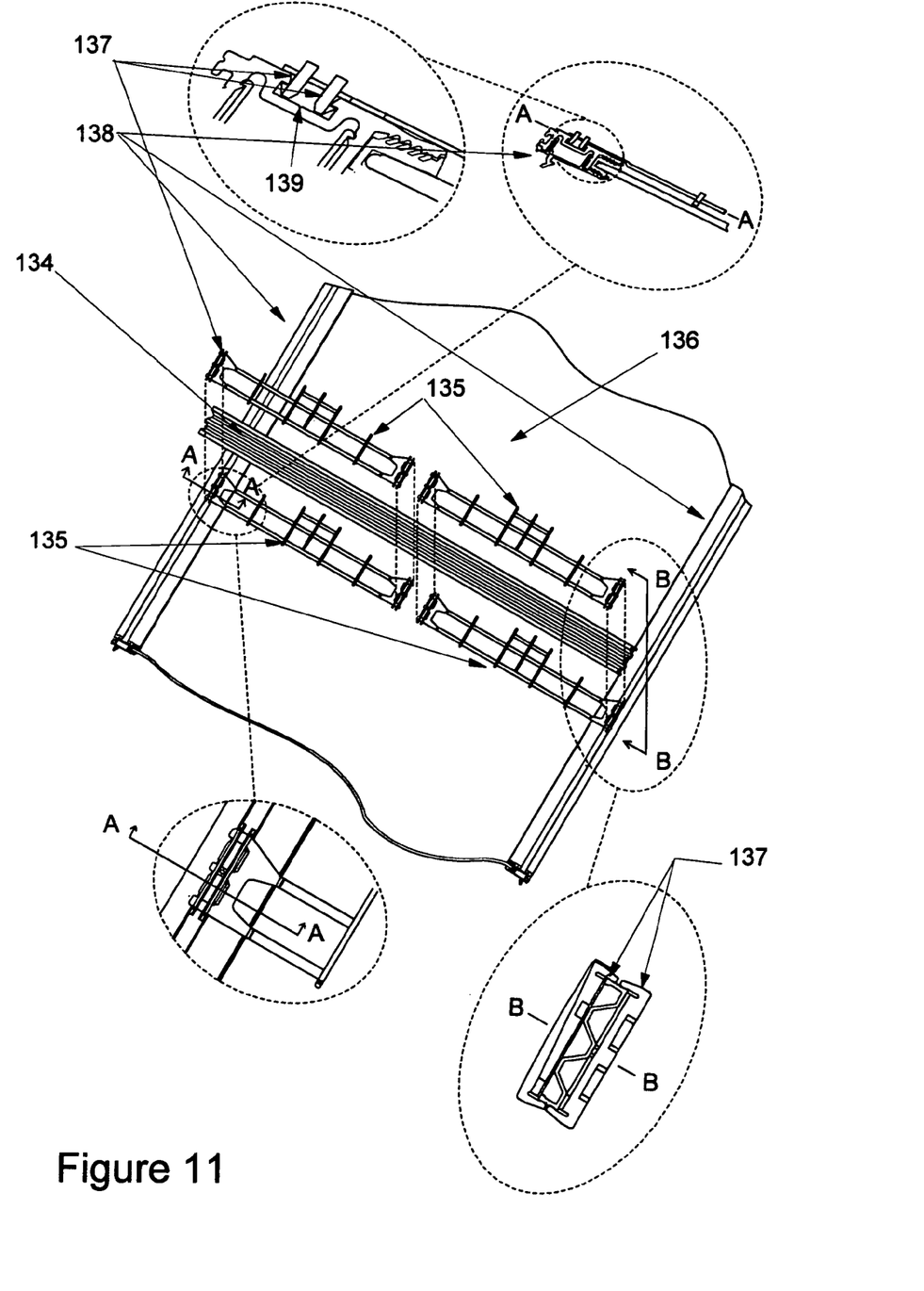
FIG. 11 is a plan view of a portion of an inverted solar tile showing detail of the transverse supports and the snap-fit arrangements used to secure these.

Referring now to FIG. 7, a portion of a superior tile 100 supported by an inferior solar tile 100A and associated superior and inferior capping elements 103 and end cap 112 shown in relation to the to side frame element 108, lower frame element 104 and the adapting corner piece 111, the solar tile frames supporting superior 102 and inferior 1 02A solar panel laminates. The lower frame elongate element 104 supports a solar laminate via an interposing sealing gasket 105, and the flat outer surface 105A of this gasket is flat in relation to the solar laminate upper surface and the lower frame element. The upper frame elongate element cross section shows the larger section 106 which has the glazing channel 110 and the depending leg snap-fitted section 107 that supports and restrains the solar tile on a batten (not shown) from movement down the structure of a building, the cross section of the solar laminate-channel sealing gasket is seen in both upper and side frame sections 110, the side frame elongate element comprises the larger lower section 109 and smaller snap-fit section 108. The skirting and sleeve weather sealing between the end cap skirting and the lower corner piece sleeving is illustrated 111A. Both larger sections of the upper and side frame elongate elements are in interior and not weather exposed locations so these sections may be of materials with less endurance to harsh weather exposure and make up a significant proportion of the total solar tile frame material and can be of a plastic material which has a lower embodied energy than aluminium material. FIG. 8 shows two corner joins in the frame system, the upper frame element flat supporting surface 114 that supports the underside of the lower frame element 104 in FIG. 1 and this surface level continues into the upper corner 113, on which the lower corner piece 117 of a superior positioned tile is supported. The extension 115 from the upper corner adapts the upper and side frame abutting surfaces together and the upstanding wall 116 of the side frame elongate element engages in a snap-fit via an undercut groove with the capping elongate element illustrated 3 in FIG. 1, the extending wall 118 of the lower corner piece forms an arched shaped sleeve into which the capping element is inserted for weather protection and the continuation of an upstanding lip 119 along the edge of the corner pieces to match the side frame element and direct water down the tile. FIG. 9 shows both upper and lower corner pieces; the upper corner piece has the flat upper surface 120B for supporting a superior lower corner piece (not shown in this juxtaposition), drainage feature 120 associated with the upstanding lip 120A also found on the upper frame element best illustrated 167 in FIG. 13 and an upstanding lip 119 for directing water down the side frame and a further drainage channel 121 to direct condensate to the exterior of the solar tile. The extension 122 to adapt between frame elements closing a gap in a water sealed fashion with grooves 125 that are for retaining a sealant applied before the frame components are brought together. A vertical wall part of an insert portion 124 adds support to the glazing gasket 110 in FIG. 7, rear vertical wall and provides mechanical strength to the upper to side frame joint by being locked in by the snap-fit of the side frame sections 108, 109 FIG. 7, when assembled. The insert profile 123 of the side frame insert shows a 'T' shaped profile that permits the side frame snap-fit legs to operate, and the upper frame insert profile 123A is adapted to the upper frame insert cavity 183 FIG. 13. On the lower corner piece in FIG. 9 the upstanding lip 119A referred to earlier and an insert profile 126 to match the lower frame elongate element cavity 184 FIG. 13, with extension 126A that adapts between the abutting side frame element and lower frame section/sealing gasket 109/110 FIG. 7, and the end of the lower frame element 104 FIG. 7&8. Locations 128 for sealant to weather seal the side frame upper snap-fit elongate section retain the sealant as the snap-fit side frame part is assembled, the insert profile 127 also has the same 'T' shape profile to permit the side frame snap-fit to operate. The extension sleeving 129 is for weather covering of the capping element 103 FIG. 7. FIG. 10 has two views of the end cap that closes the capping elongate element with an insert extension 131 that slides into the end profile of the capping element 103 FIG. 7, and is held by the undercuts 155A FIG. 12, of the capping elongate element that mate to the surfaces 131A on the end cap. The end cap is held in the inserted position by deforming the capping element vertical side-walls 132A FIG. 7, into slots 132 FIG. 10, provided on the end cap locking the end cap in the capping elongate element. The weather skirting 133 on the end cap is provided to co-operate with the weather sleeving extension of the lower corner piece best illustrated in FIG. 7, 111A, where the smooth front face 112 of the end cap as inserted inside the capping elongate element 103 is seen. FIG. 11 shows a portion of a solar tile in inverse plan isometric view; at approximately the mid-position, a transverse support 134 is provided and is snap-fit held at each end to the side frame elements 138. In one embodiment the transverse support 134 is an aluminium extrusion with an associated plastic moulded array of parallel ribs 135, The array of spacer ribs 135 located under the transverse support between it and the back of the panel laminate 136 form vertical hollow channels that allow condensate water on the back of the laminate to run freely past the transverse support. A spacing array 135 is also located above the transverse support for spacing from a further batten in the building structure. Spacer rib arrays are snap-fit attached to the transverse support by undercut snap fingers 137 at the end of each rib. Two ribs 137 located at the extreme ends of each array 135 have undercuts that engage in a snap-fit into a mushroom shaped undercut channel 139 in the side frame 138 to attach the transverse support to the side frame.

Figure 12:
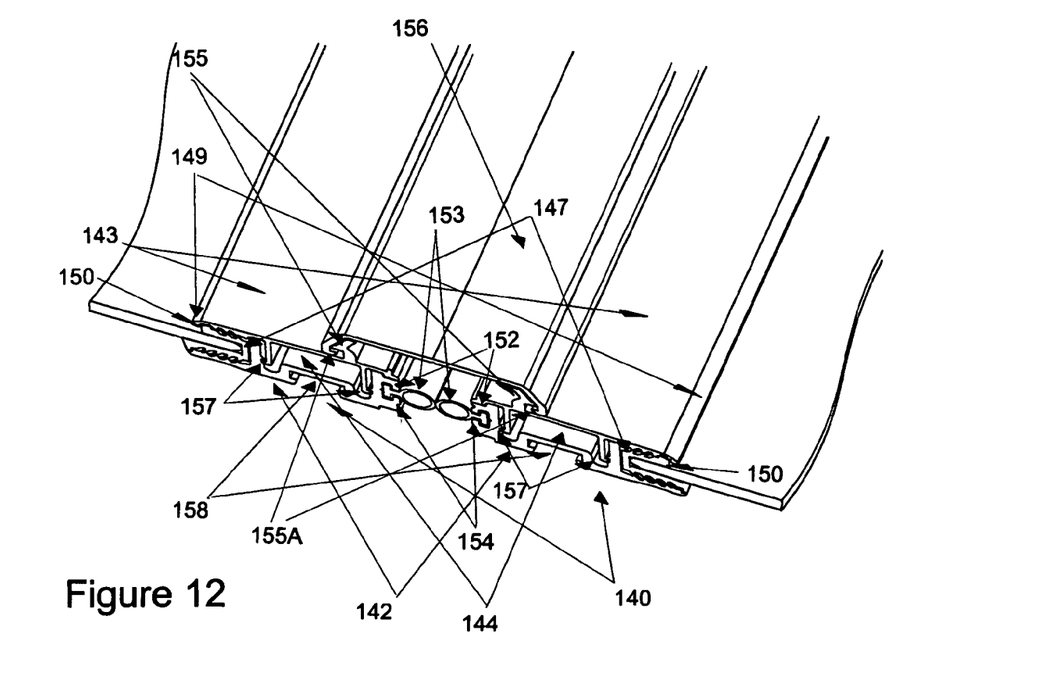
FIG. 12 is a cross-sectional view on an enlarged scale illustrating weather resistant joints between adjacent side frame elements of the solar tiles as used in FIGS. 7 and 8; and, FIG. 13 is a detailed cross-sectional view on an enlarged scale showing the interrelationship of an upper frame element of a first inferior solar tile which is supporting the lower frame element of a second superior solar tile.

Referring now to FIG. 12, a joint between adjacent solar tiles is illustrated. Preferably the side frame element 140 in each case is a composite of a section 142 and a snap-fit section 143. The combined sections have a tubular body portion 144 and a glazing channel defined between spaced walls which accommodate a solar tile laminate sealingly engaged in a polymeric channel-shaped sealing gasket 147.

The side frame snap-fit section 143 has a lip 149 which overhangs a tip portion 150 of the polymeric seal and compresses it to the solar laminate and protects it against the effects of the elements including rainwater and ultra-violet light ensuring a reliable seal is established and maintained. The free upstanding edge wall 154 of the plastic side section 142 has an undercut portion for accommodating a T-shaped rib 152 of a resiliently deformable tubular seal 153.

The tubular seals are designed to permit the solar panels to be conveniently located slightly spaced from one another and to ensure that the space between respective, upstanding retaining walls 154, also 155 is accurately controlled. Each of the side frame snap-fit section 143 has a shoulder 155 extending upwardly for snap-fitting engagement with a capping element or cover strip 156. A small upstanding wall 155A on the side frame snap section is to contain any moisture that may flow inside the and below the capping element 156 and this upstanding wall feature is continued on both upper and lower adaptive corner insert pieces as shown 119 and 119A in FIG. 9. drainage The capping element 156 can conveniently be secured with a fixing screw at a location of the lower corner piece of the superior tile. The side frame snap-fit section engages the side frame plastic section by means of the inverse undercuts 157 in opposing depending legs that lock into undercuts 157 in the plastic side frame section.

Figure 13:
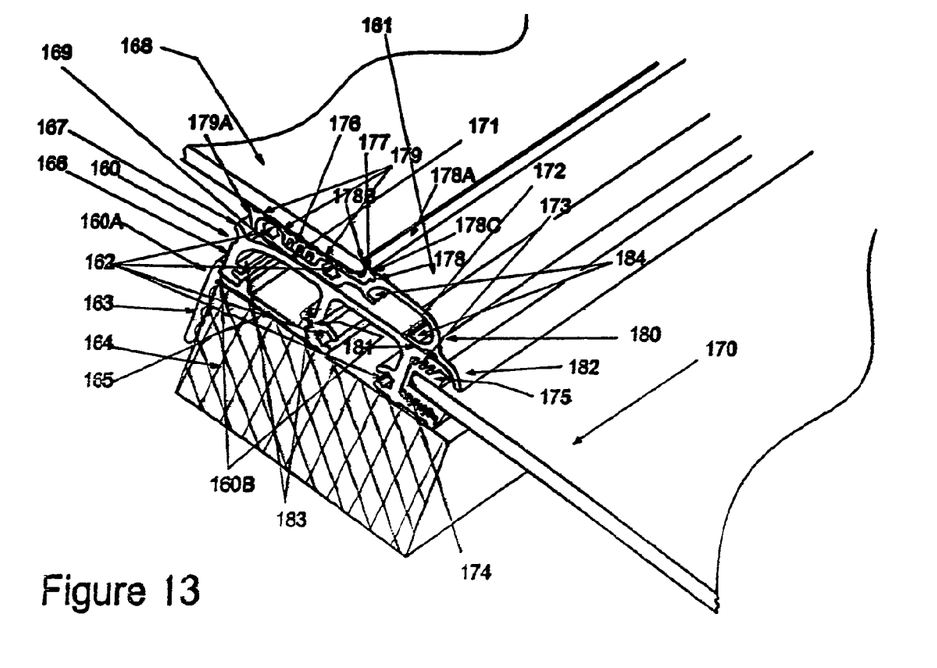

FIG. 13 shows a mushroom cross section undercut channel 158 integrally formed into the side element extrusion for accommodating snap-fit securing ribs identified in FIG. 11 as item 137 and which secure in place the transverse beam 134 FIG. 11.

Referring now to FIG. 13, an upper frame element for an inferior solar tile, made of two sections 160, 160A is shown together with a lower frame element 161 of a superior solar tile in overlapping relationship and illustrating the installed position. As indicated in FIG. 8, joints are formed at each corner of the solar tile frame and preferably two screws (not shown) are applied through the side wall of the side frame element to threadably engage in self tapping arrangement with corresponding receiving cavities 162 in the upper and lower frame elements.

The upper frame element 160 has a snap-fit section 160A that snaps in place by interference fit at points 160B, and that has the depending retaining wall 163 for hooking behind the edge of a batten 164 to retain in position the solar tile, and a lateral wall 165 for supporting the solar tile. The rear wall 166 incorporates an upstanding lip 167 which ensures deflection of any condensation dripping off the underside of a superior solar tile laminate 168 to deflect the condensate along the upper surface of the wall 169 from which drainage occurs to the exterior of the inferior solar panel 170 via the gap provided between upper and lower frame elements 171 and recess 172 provided for weather sealing purposes.

The wall element 169 also incorporates a glazing channel defined between a pair of walls 173 and 174 between which a U-shaped polymeric sealing element 175 is located. The lower frame element 161 has a flat-shaped polymeric gasket element 176 for sealing engagement with the laminate 168, and has an upwardly curving wall 177 with a ridge portion located in a groove 178 of the lower frame section, the external surface 178A of the gasket is in the same plane as the upper surface of the solar laminate 168 and the lower frame 161 external surface and is a minimal barrier to water run-off. The polymeric gasket has a tapering edge that forms an overhanging lip 178B, reinforced in position by lower frame overhanging lip feature 178C that makes a seal to the solar laminate radius ground edge. A multitude of ridges 179 on the gasket provide a seal to the underside of the solar laminate 168, an inverted triangular edge 179A of the gasket forms a seal to laminate underside surface and is a face to direct condensate inside the inferior upper frame drainage lip 167.

At its free-edge region the lower frame element 161 has a forward depending wall 180 with a base wall portion 181 configured for support on the upper face of element 160 by setting into a slight recess 172 in the upper face of element 160 and an extending downwardly curved lip 182 which overhangs the sealing membrane 175 for weather protection purposes. Ledges are provided in the lower 183 and upper frame 184 section insert cavity profiles to retain respective insert extensions of the adapting corner pieces (best seen in FIG. 9 element 126 and 123A) locking them from vertical and side-to-side movement in the frame elements.

The invention claimed is:

1. A framing system for mounting a solar laminate to form a solar panel which is to be mounted at an inclination to horizontal on a building structure, the framing system comprising:
   (a) an upper elongate frame element;
   (b) two side elongate frame elements;
   (c) wherein;
   i) each of said frame elements has an elongate channel for engaging in weather-sealing relationship with an associated edge of the solar laminate and;
   ii) the frame elements are adapted to be inter-connected at respective corners of the frame system,
   d) the upper frame element has a depending retaining element for retaining the framing system from movement in a direction down the building structure, a supporting element for supporting the frame system on a batten of the building structure and an upper portion for weather-sealing purposes, the upper portion being spaced from the elongate channel and being adapted to support in overlapping, weather-sealing relationship a lower portion of a further solar panel, and;
   (e) the side frame elements each having, in an upper surface portion, an upstanding wall element for cooperation with a capping element adapted to bridge between adjacent solar panels to form a weather seal.

2. A framing system as claimed in claim 1, and wherein the system further includes a lower frame element having an elongate channel for engaging in weather sealing relationship with an associated edge of the solar laminate.

3. A framing system as claimed in claim 1 and wherein the upper frame element also has an upstanding lip for catchment and subsequent direction to external drainage of internal condensate moisture.

4. A framing system as claimed in claim 1 and further including transverse supporting elements adjustable in position in the framing system.

5. A framing system as claimed in claim 1 and wherein at least one of the side frame elements on an outer upstanding edge face has means for mounting a resiliently deformable seal whereby adjacent panels engage via the seal in a manner which controls the spacing between panels, yet permits the taking-up of tolerances.

6. A framing system as claimed in claim 1 and wherein the upstanding wall element on each side frame element has an undercut whereby snap-fitting engagement is achieved with the corresponding depending wall of the capping element.

7. A framing system as claimed in claim 1 and wherein said upper wall element and a lower wall element are formed from an extrusion of generally an open box structure and includes screw shank engagement cavities whereby fixing screws applied from the exterior of the side of the side frame elements can engage to secure corner joints.

8. A framing system as claimed in claim 1 further including a lower frame element with a tip portion for engaging the upper portion of the upper frame element of an adjacent framed solar panel and extends to an overhanging lip element for engaging the adjacent solar panel and shielding from the weather the elongate channel in the upper frame element of the adjacent framed solar panel.

9. A framing system as claimed in claim 1 further including a lower elongate frame element made of two parts, one part being a smaller snap-fit part which forms an uppermost wall of the elongate channel for weather sealing of the lower frame element to the solar laminate and which engages with a larger part in a snap-fit with undercuts at the lower end of two depending walls from the smaller part engaging with corresponding undercuts in the larger part, the smaller part having a sealant groove on the lower surface of the wall for forming weather sealing for the solar laminate when snapped into place, the groove retaining a polymeric sealing compound to form a weather/water seal between a lower elongate frame element inside upper edge and the solar laminate.

10. A framing system as claimed in claim 1 and wherein each side frame element is an extrusion having a body portion of hollow form, an outer side wall accommodating an undercut groove for retaining a flange of a seal and in the opposite side an elongate glazing channel is provided to mount the solar laminate so that an overhanging lip is provided for protecting from the weather and UV exposure the glazing channel where sealing occurs.

11. A framing system as claimed in claim 1 further including a glazing polymeric seal with an asymmetric shape, a lip on a lower wall portion extending beyond the edge of a lower glazing channel wall providing additional support to the underside of the solar panel, and an upper wall being constrained to fit under and inside a glazing channel overhanging lip.

12. A framing system as claimed in claim 1, and wherein each side frame elongate element incorporates in its lower surface an undercut channel of mushroom-shaped cross section for receiving a snap-fit arrangement.

13. A framing system as claimed in claim 12, and wherein the undercut channel is used for the snap fit attachment of transverse batten support elements for supporting the solar panel off a roofing batten and these transverse elements are adjustable in position on the side frame elongate elements by virtue of the snap fit arrangement that can be slid along the undercut channel.

14. A framing system as claimed in claim 1 and wherein a transverse batten support element is made up of an elongate element that spans from one side frame elongate element to the other and further includes attachments by snap fitting of sets of spacers that;
   i) have vertical ribs that by attaching to the upper side of the transverse batten support element span the gap between the underside of the solar panel and the top surface of the transverse batten supporting element,
   ii) have vertical ribs that by attaching to the underside of the transverse batten support, vertically span the gap between the bottom of the transverse batten support element and the roof batten,
   iii) have the shape of a set of vertically running ribs held together by horizontal runners, each vertical rib having a lower undercut at either end that provides the snap fitting of the spacers to the transverse batten support, and,
   iv) at the ends of each spacer are an additional pair of the vertical ribs with an undercut shape for snap engaging into the under cut channel on the lower surface of the side frame elongate elements, and thereby act as a snap attachment of the transverse batten support element to the side frame elongate element.

15. A framing system as claimed in claim 1 and wherein the lower frame element has a retaining recess channel portion that takes a sealing gasket onto which a portion of a solar laminate lower edge underside lies.

16. A framing system as claimed in claim 1 and wherein a seal between a lower frame elongate element and the solar panel is made by an elongate polymeric interface gasket of a generally flat, broad shape with a precise profile adapting between a lower surface of the solar laminate and an upper surface of the lower frame elongate element so that the upper surface of the solar laminate and the external exposed portion of the lower frame elongate element are at the same surface height and present no barrier to water running off the solar laminate external surface, this junction between the solar laminate and lower frame element being subject to the most water.

17. A framing system as claimed in claim 1 further including a sealing gasket with an upper curving lip section that seals between a curved face, vertically rising, in a lower frame element and retains a thin curved edge of the solar panel protecting and insulating it from direct mechanical and electrical contact to the lower frame material and protecting the solar panel from long term weather exposure.

18. A framing system as claimed in claim 17 and wherein the sealing gasket has a returning overhang lip portion at the top of the curved face that narrows to a fine edge, as a compliant seal to the upper surface edge of the solar panel that provides minimal restriction to water flow off the external surface of the solar laminate whilst effecting a seal between the upper surface edge and the gasket and the lower frame element along this joint.

19. A framing system as claimed in claim 18 and wherein an upper lip of the sealing gasket has a ridge profile at an external face of the upper curving lip section that engages into a groove with an overhanging lip portion in a lower frame elongate element recess channel section that retains the gasket upper lip firmly.

20. A framing system as claimed in claim 1 and wherein a sealing gasket extends under the solar panel bottommost surface and has a series of ribbed features that act as a multitude of sealing surfaces to the solar laminate underside to an extent that any water that may enter between the solar laminate and the sealing gasket can not travel far due to the sealing properties of the sealing gasket and gravity due to the downward slope angle that the solar tile is usually installed.

21. A framing system as claimed in claim 1 and wherein an upper edge of a broad, flat sealing gasket is shaped with an inverted triangular profile portion that fits over the uppermost edge of a lower frame element and forms a join with an underlying surface at an angle to the solar panel back surface to direct any condensation moisture by surface adhesion into a drainage channel formed by a upstanding lip of the upper frame elongate element directly beneath in the solar panel.

22. A framing system as claimed in claim 1 and wherein each elongate frame element is made of two parts, one being a smaller snap fit part which forms an uppermost wall of the elongate channel for weather sealing of a lower frame element to the solar panel and which engages with a larger part in a snap-fit with undercuts at the lower end of two depending walls from the smaller part engaging with corresponding undercuts in the larger part, the smaller snap fit section having a sealant groove on the lower surface of the walls for forming weather sealing for the solar panel when snapped into place, the groove being for retaining a polymeric sealing gasket or polymeric compound to form a weather/water seal between the lower frame element inside upper edge and the solar panel.

23. A framing system as claimed in claim 1 and wherein a joint between each of the upper frame element and a lower frame element to the side frame elements are made through adaptive corner pieces that have extensions of a profile shape which can insert into each adjoining frame element and that are also clamped and secured tightly together between the adjoining side frame elements.

24. A framing system as claimed in claim 22 and wherein a corner piece has an upstanding lip along an upper edge aligned in the axis of the side elongate frame element that mates to the same shape of upstanding lip on the smaller snap-fit section, the upstanding lip being to retain any water downward to the external surface of the tile.

25. A framing system as claimed in claim 24 and wherein the corner piece has an extension that adapts between the side elongate frame element the polymeric and sealing gasket and a lower frame end profile face.

26. A framing system as claimed in claim 1 and wherein an upper corner piece has a generally flat upper surface so that a lower corner piece can be supported on the flat surface and form part of a weather overlap seal without interference between the lower and upper corner pieces by the side elongate frame elements and the capping element, interference between upper and lower corner pieces is avoided by:
  i) an arch profile in the front face of the lower corner piece,
  ii) a smaller section being shorter in length than a larger side frame elongate section, the larger section also underlies and becomes clamped to an upper corner flat surface,
  iii) the smaller section being located farther down the side elongate element from the upper corner piece than the larger side frame section but in a weather sealing relationship to the generally flat upper surface of the upper corner piece.

27. A framing system as claimed in claim 26 and wherein the capping element has an end cap that:
  i) closes an open lower end of a capping elongate element and is secured to the capping element by means of deforming a capping elongate element side-wall end edge to fold into slots on an end cap moulding or by use of an adhesive,
  ii) has a lower skirting wall on either side wall that when fixed and integral to the capping elongate element lies inside a sleeve formed by opposing extending walls of adjacent left and right hand lower corner pieces on the solar panel, and
  iii) is made of a moulded material suited to long term solar exposure.

* * * * *